United States Patent
Schultz et al.

(10) Patent No.: US 9,912,750 B2
(45) Date of Patent: Mar. 6, 2018

(54) DATA PATH SELECTION FOR NETWORK TRANSFER USING HIGH SPEED RDMA OR NON-RDMA DATA PATHS

(71) Applicants: Jason C Schultz, Roseville, MN (US); John A Peters, Roseville, MN (US); Robert Bergerson, Roseville, MN (US); James R Heit, Roseville, MN (US)

(72) Inventors: Jason C Schultz, Roseville, MN (US); John A Peters, Roseville, MN (US); Robert Bergerson, Roseville, MN (US); James R Heit, Roseville, MN (US)

(73) Assignee: Unisys Corporation, Blue Bell, PA (US)

( * ) Notice: Subject to any disclaimer, the term of this patent is extended or adjusted under 35 U.S.C. 154(b) by 123 days.

(21) Appl. No.: 14/340,712

(22) Filed: Jul. 25, 2014

(65) Prior Publication Data

US 2016/0028819 A1    Jan. 28, 2016

(51) Int. Cl.
*H04L 29/08* (2006.01)
*H04L 12/861* (2013.01)

(52) U.S. Cl.
CPC ...... *H04L 67/1097* (2013.01); *H04L 49/9005* (2013.01); *H04L 67/1095* (2013.01)

(58) Field of Classification Search
CPC ............. H04L 67/1097; H04L 67/1095; H04L 29/9005
USPC ......................................................... 709/212
See application file for complete search history.

(56) References Cited

U.S. PATENT DOCUMENTS

| | | | | |
|---|---|---|---|---|
| 8,621,029 | B1 * | 12/2013 | Grier | H04L 67/1097 709/212 |
| 8,671,152 | B2 * | 3/2014 | Horie | G06F 13/105 370/229 |
| 8,762,476 | B1 * | 6/2014 | Evans | H04L 29/06517 709/212 |
| 2002/0168966 | A1 * | 11/2002 | Tillier | H04L 67/34 455/412.1 |
| 2013/0332596 | A1 * | 12/2013 | Jones | H04L 43/0882 709/224 |
| 2014/0297775 | A1 * | 10/2014 | Davda | G06F 13/28 709/212 |

* cited by examiner

*Primary Examiner* — Kevin Bates
*Assistant Examiner* — Nazia Naoreen

(57) ABSTRACT

A method and apparatus for high-speed data path selection for network transfer using IP addresses is disclosed. The method may include configuring an IP address for a non-RDMA data transfer or an RDMA high speed data transfer. An application executing in an emulated environment may transfer data using the same function calls for both non-RDMA data transfer or an RDMA high speed data transfer. This reduces changes to the application to allow RDMA transfers. A non-emulated interface determines whether the IP address is flagged as an RDMA address. If so, the data is transferred via an RDMA data path. If the IP address is not flagged as an RDMA address, the data is transferred via a non-RDMA data path through a traditional network stack.

18 Claims, 6 Drawing Sheets

DATA PATH SELECTION FOR NETWORK TRANSFER USING HIGH SPEED RDMA OR NON-RDMA DATA PATHS

FIELD OF THE DISCLOSURE

The instant disclosure relates to computer systems. More specifically, this disclosure relates to a data path selection for network transfer for handling network requests from an emulated environment.

BACKGROUND

Applications executing in an emulated environment may be unaware of the hardware carrying out the instructions executed by the applications in the emulated environment. The emulation may allow the execution, on a first hardware system, of applications designed for a different second hardware system. However, because the applications in the emulated environment may have limited interaction with the hardware executing the applications, the applications may be unable to control certain aspects of the execution of the applications. For example, an application executing in an emulated environment may not be aware of the capability of RDMA transfer through a network interface or be able to specify how network traffic should be handled. However, the use of RDMA transfer may significantly improve network transfer performance for the application. Thus, there is a desire to allow transfer of network packets from the application in the emulated environment using RDMA without modifying the application to support RDMA.

SUMMARY

The speed of network traffic between customer applications and central servers may be improved by providing an alternative high speed data path to the traditional network stack. According to one embodiment, a method may comprise receiving, at a non-emulated interface, a network transfer request from a program executed in an emulated environment and determining, by the non-emulated interface, that the network transfer request is an RDMA request. The method may further comprise calling, by the non-emulated interface, an API suitable for an RDMA transfer, receiving an answer from the API, and transferring network traffic packets related to the network transfer request using RDMA.

Conventionally, non-RDMA transport protocol is the only way to transfer network traffic from the application in the emulated environment. Because network traffic using non-RDMA APIs travels through a traditional network stack, the network traffic is slowed by latency introduced by the network stack. Without the described operation and configuration of the non-emulated interface to determine when to pass network traffic to an RDMA API, the application in the emulated environment would be unable to transmit network traffic with RDMA without being modified.

In some embodiments, the program may receive the network transfer request comprising an RDMA IP address from a customer application. The method may further comprise detecting that an IP address is flagged as an RDMA IP address. In some embodiments, the method may further comprise determining that no answer is received from the API suitable for an RDMA transfer and transferring network traffic packets related to the network transfer request through a network stack using TCP/IP. In some embodiments, the IP address may support both RDMA and TCP/IP transfer protocols. The customer application may use the same function calls for both RDMA network transfer requests and TCP/IP network transfer requests.

According to another embodiment, a computer program product may include a non-transitory computer-readable medium comprising code to perform the steps of receiving, at a non-emulated interface, a network transfer request from a program executed in an emulated environment and determining, by the non-emulated interface, that the network transfer request is a RDMA request. The medium may also include code to perform the steps of calling, by the non-emulated interface, an API suitable for an RDMA transfer and receiving an answer from the API; and transferring network traffic packets related to the network transfer request using RDMA.

In some embodiments, the program may receive the network transfer request comprising an RDMA IP address from a customer application. The medium may also include code to perform the step of detecting that an IP address is flagged as an RDMA IP address. In some embodiments, the medium may further include code to perform the steps of determining that no answer is received from the API suitable for an RDMA transfer and transferring network traffic packets related to the network transfer request through a network stack using TCP/IP. In some embodiments, the IP address may support both RDMA and TCP/IP transfer protocols. The customer application may use the same function calls for both RDMA network transfer requests and TCP/IP network transfer requests.

According to yet another embodiment, an apparatus may include a storage device, a memory, and a processor coupled to the memory and storage device. The processor may be configured to execute the steps of receiving, at a non-emulated interface, a network transfer request from a program executed in an emulated environment and determining, by the non-emulated interface, that the network transfer request is a RDMA request. The medium may also include code to perform the steps of calling, by the non-emulated interface, an API suitable for an RDMA transfer and receiving an answer from the API; and transferring network traffic packets related to the network transfer request using RDMA.

In some embodiments, the program may receive the network transfer request comprising an RDMA IP address from a customer application. The processor may further be configured to execute the step of detecting that an IP address is flagged as an RDMA IP address. In some embodiments, the processor may be configured to execute the steps of determining that no answer is received from the API suitable for an RDMA transfer and transferring network traffic packets related to the network transfer request through a network stack using TCP/IP. In some embodiments, the IP address may support both RDMA and TCP/IP transfer protocols. The customer application may use the same function calls for both RDMA network transfer requests and TCP/IP network transfer requests.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features that are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the disclosed system and methods, reference is now made to the following descriptions taken in conjunction with the accompanying drawings.

DETAILED DESCRIPTION

Figure 1:
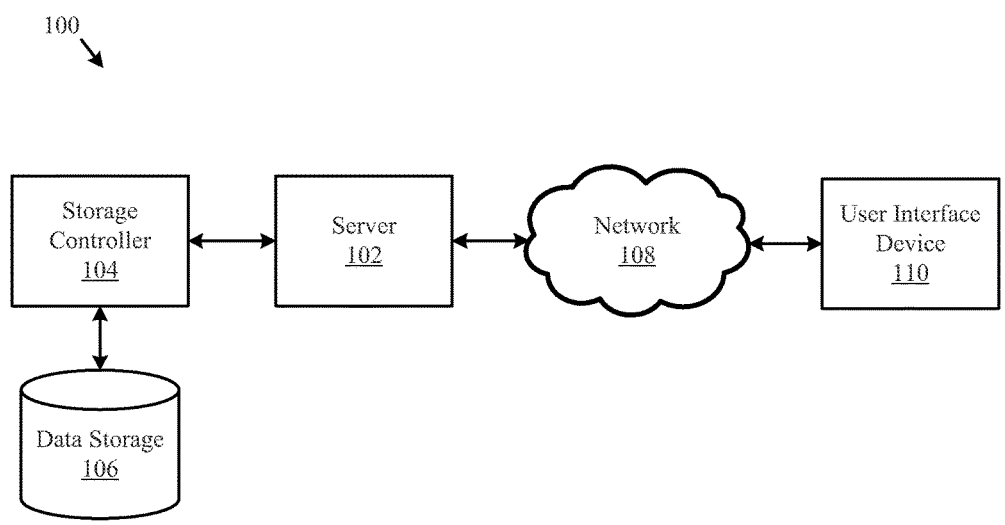
FIG. 1 is a block diagram illustrating a computer network according to one embodiment of the disclosure.

FIG. 1 illustrates one embodiment of a system 100 for high speed data path selection for network transfer using, for example, IP addresses according to one embodiment of the disclosure. The system 100 may include a server 102, a data storage device 106, a network 108, and a user interface device 110. In a further embodiment, the system 100 may include a storage controller 104, or a storage server configured to manage data communications between the data storage device 106 and the server 102 or other components in communication with the network 108. In an alternative embodiment, the storage controller 104 may be coupled to the network 108.

In one embodiment, the user interface device 110 is referred to broadly and is intended to encompass a suitable processor-based device such as a desktop computer, a laptop computer, a personal digital assistant (PDA) or tablet computer, a smartphone or other mobile communication device having access to the network 108. In a further embodiment, the user interface device 110 may access the Internet or other wide area or local area network to access a web application or web service hosted by the server 102 and may provide a user interface for enabling a user to enter or receive information, such as retrieving a list of flagged IP addresses for RDMA transfer of network requests.

The network 108 may facilitate communications of data between the server 102 and the user interface device 110. The network 108 may include any type of communications network including, but not limited to, a direct PC-to-PC connection, a local area network (LAN), a wide area network (WAN), a modem-to-modem connection, the Internet, a combination of the above, or any other communications network now known or later developed within the networking arts which permits two or more computers to communicate.

Figure 2:
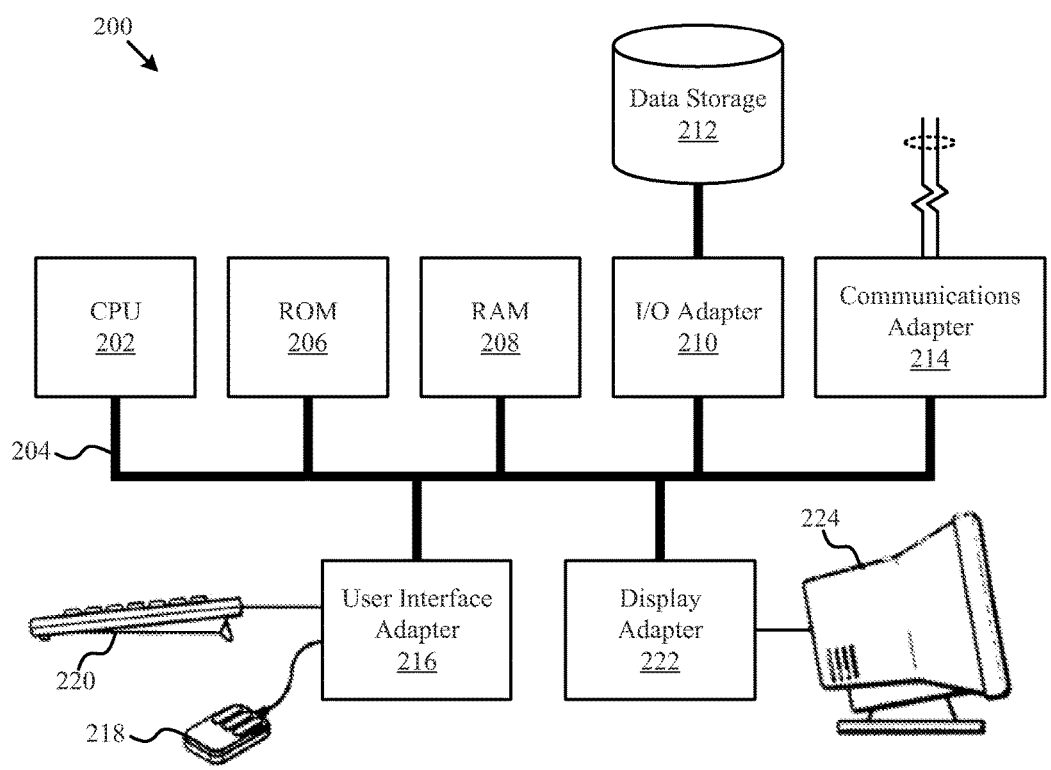
FIG. 2 is a block diagram illustrating a computer system according to one embodiment of the disclosure.

FIG. 2 illustrates a computer system 200 adapted according to certain embodiments of the server 102 and/or the user interface device 110. The central processing unit ("CPU") 202 is coupled to the system bus 204. The CPU 202 may be a general purpose CPU or microprocessor, graphics processing unit ("GPU"), and/or microcontroller. The present embodiments are not restricted by the architecture of the CPU 202 so long as the CPU 202, whether directly or indirectly, supports the operations as described herein. The CPU 202 may execute the various logical instructions according to the present embodiments.

The computer system 200 may also include random access memory (RAM) 208, which may be synchronous RAM (SRAM), dynamic RAM (DRAM), synchronous dynamic RAM (SDRAM), or the like. The computer system 200 may utilize RAM 208 to store the various data structures used by a software application. The computer system 200 may also include read only memory (ROM) 206 which may be PROM, EPROM, EEPROM, optical storage, or the like. The ROM may store configuration information for booting the computer system 200. The RAM 208 and the ROM 206 hold user and system data, and both the RAM 208 and the ROM 206 may be randomly accessed.

The computer system 200 may also include an input/output (I/O) adapter 210, a communications adapter 214, a user interface adapter 216, and a display adapter 222. The I/O adapter 210 and/or the user interface adapter 216 may, in certain embodiments, enable a user to interact with the computer system 200. In a further embodiment, the display adapter 222 may display a graphical user interface (GUI) associated with a software or web-based application on a display device 224, such as a monitor or touch screen.

The I/O adapter 210 may couple one or more storage devices 212, such as one or more of a hard drive, a solid state storage device, a flash drive, a compact disc (CD) drive, a floppy disk drive, and a tape drive, to the computer system 200. According to one embodiment, the data storage 212 may be a separate server coupled to the computer system 200 through a network connection to the I/O adapter 210. The communications adapter 214 may be adapted to couple the computer system 200 to the network 108, which may be one or more of a LAN, WAN, and/or the Internet. The user interface adapter 216 couples user input devices, such as a keyboard 220, a pointing device 218, and/or a touch screen (not shown) to the computer system 200. The display adapter 222 may be driven by the CPU 202 to control the display on the display device 224. Any of the devices 202-222 may be physical and/or logical.

The applications of the present disclosure are not limited to the architecture of computer system 200. Rather the computer system 200 is provided as an example of one type of computing device that may be adapted to perform the functions of the server 102 and/or the user interface device 110. For example, any suitable processor-based device may be utilized including, without limitation, personal data assistants (PDAs), tablet computers, smartphones, computer game consoles, and multiprocessor servers. Moreover, the systems and methods of the present disclosure may be implemented on application specific integrated circuits (ASIC), very large scale integrated (VLSI) circuits, or other circuitry. In fact, persons of ordinary skill in the art may utilize any number of suitable structures capable of executing logical operations according to the described embodiments. For example, the computer system 200 may be virtualized for access by multiple users and/or applications.

Figure 3:
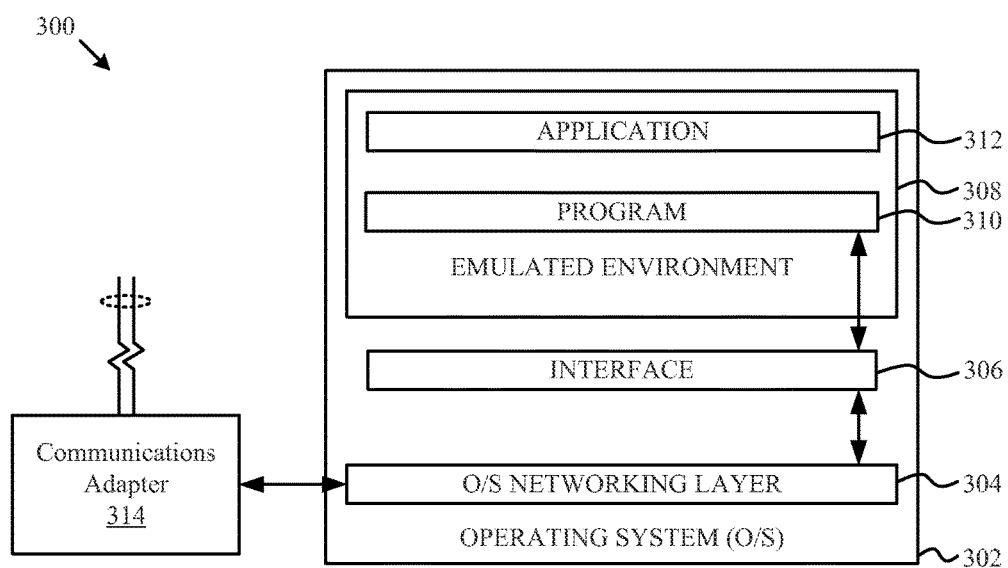
FIG. 3 is a block diagram illustrating a server hosting an emulated software environment for virtualization according to one embodiment of the disclosure.

FIG. 3 is a block diagram illustrating a server hosting an emulated software environment for virtualization according to one embodiment of the disclosure. An operating system 302 executing on a server includes drivers for accessing hardware components, such as a networking layer 304 for accessing the communications adapter 314. The operating system 302 may be, for example, Linux or Windows. An emulated environment 308 in the operating system 302 executes a program 310, such as Communications Platform for Open Systems (CPCommOS). The program 310 accesses the networking layer 304 of the operating system 302 through a non-emulated interface 306, such as eXtended Network Input Output Processor (XNIOP). The non-emulated interface 306 translates requests from the program 310 executing in the emulated environment 308 for the networking layer 304 of the operating system 302. Applications 312 may also be executing in the emulated environment 308 or inside of program 310. In one embodiment, these applications 312 may access the networking layer 304 of the operating system 302 through a non-emulated interface 306 using program 310.

Figure 4:
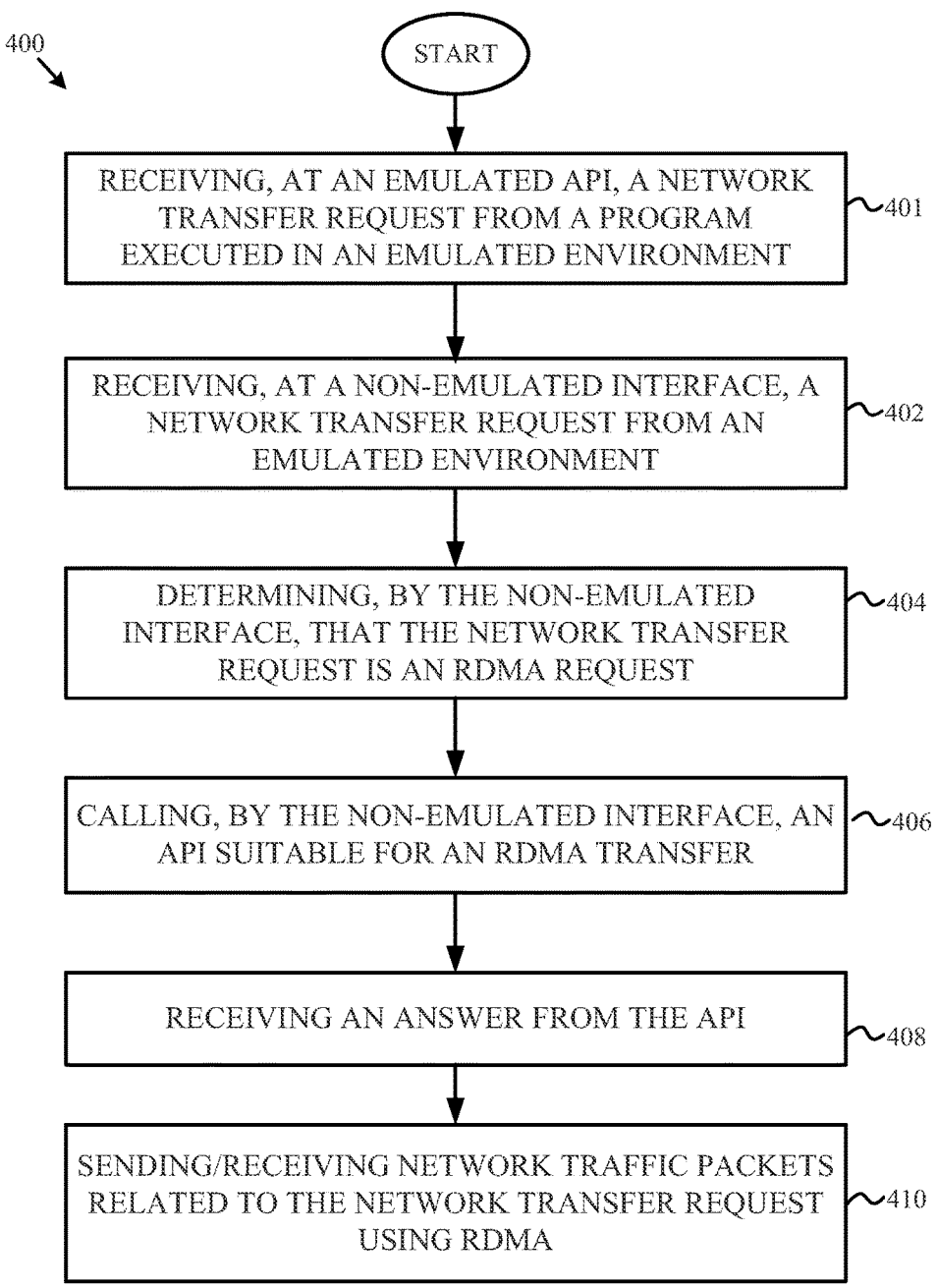
FIG. 4 is a flow chart illustrating a method of transferring high speed network traffic over a high speed path using IP addresses according to one embodiment of the disclosure.

FIG. 4 is a flow chart illustrating a method of transferring high speed network traffic over a high speed path using IP addresses according to one embodiment of the disclosure. Method 400 may start at block 401 with receiving, at an emulated application programming interface (API), a network transfer request from a program executed in an emulated environment. Then, at block 402, a network transfer request may be received at a non-emulated interface from, for example, a program 310, such as CPCommOS, executed in emulated environment 308. An application 312 can access a user interface device 110 or server using program 310. Network traffic from the application may be transmitted to the server or user interlace device via a non-RDMA network stack, such as the Berkeley sockets (BSD), or transfer using RDMA. In prior systems, the application only had capability to send network traffic using the non-RDMA API of the non-emulated interface 306. However, in the embodiment shown, the application 312 may transfer network traffic using RDMA without modification to the application 312. This results in lower overhead and greater convenience in the design of the application 312. In order to achieve this functionality, both non-RDMA and RDMA transfer may be supported by the same IP address.

The customer may configure an RDMA IP address in a CPCommOS configuration using an CPCommOS configuration file. The CPCommOS contains the same functions a customer would use to configured a non-RDMA IP address. The IP address may be an IPv4 or an IPv6 address. The configuration may be on a CPCommOS application basis or may be global for all applications. When CPCommOS begins, it may send the customer configuration to I/O processor XNIOP. XNIOP may be a Linux component that accepts network transfer requests from CPCommOS. The customer may run the application indicating that application should use 1) an RDMA IP address, 2) a non-RDMA IP address, and 3) an IP address for both data paths depending on a CPCommOS API to be used. The same CPCommOS API calls may be made by the application regardless of whether the request is a non-RDMA request or an RDMA request.

At block 404, method 400 may include determining that the network transfer request is an RDMA request. In the embodiment shown, XNIOP determines whether an IP address has been flagged by the customer for RDMA transfer. If so, method 400 may continue at block 406 with XNIOP calling an API suitable for an RDMA transfer. For example, when XNIOP detects an RDMA request, it may call an OFED (OpenFabrics Enterprise Distribution) API instead of a traditional BSD sockets API. In this manner, XNIOP may transfer the data using RDMA to avoid latency associated with transferring the data over the traditional network stack. Method 400 may continue at block 408 and XNIOP may receive an answer from a OFED API. Once XNIOP receives an answer, method 400 may conclude at block 410 as XNIOP transfers by sending or receiving the data using RDMA.

The schematic flow chart diagram of FIG. 4 is generally set forth as a logical flow chart diagram. As such, the depicted order and labeled steps are indicative of one aspect of the disclosed method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagram, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 5:
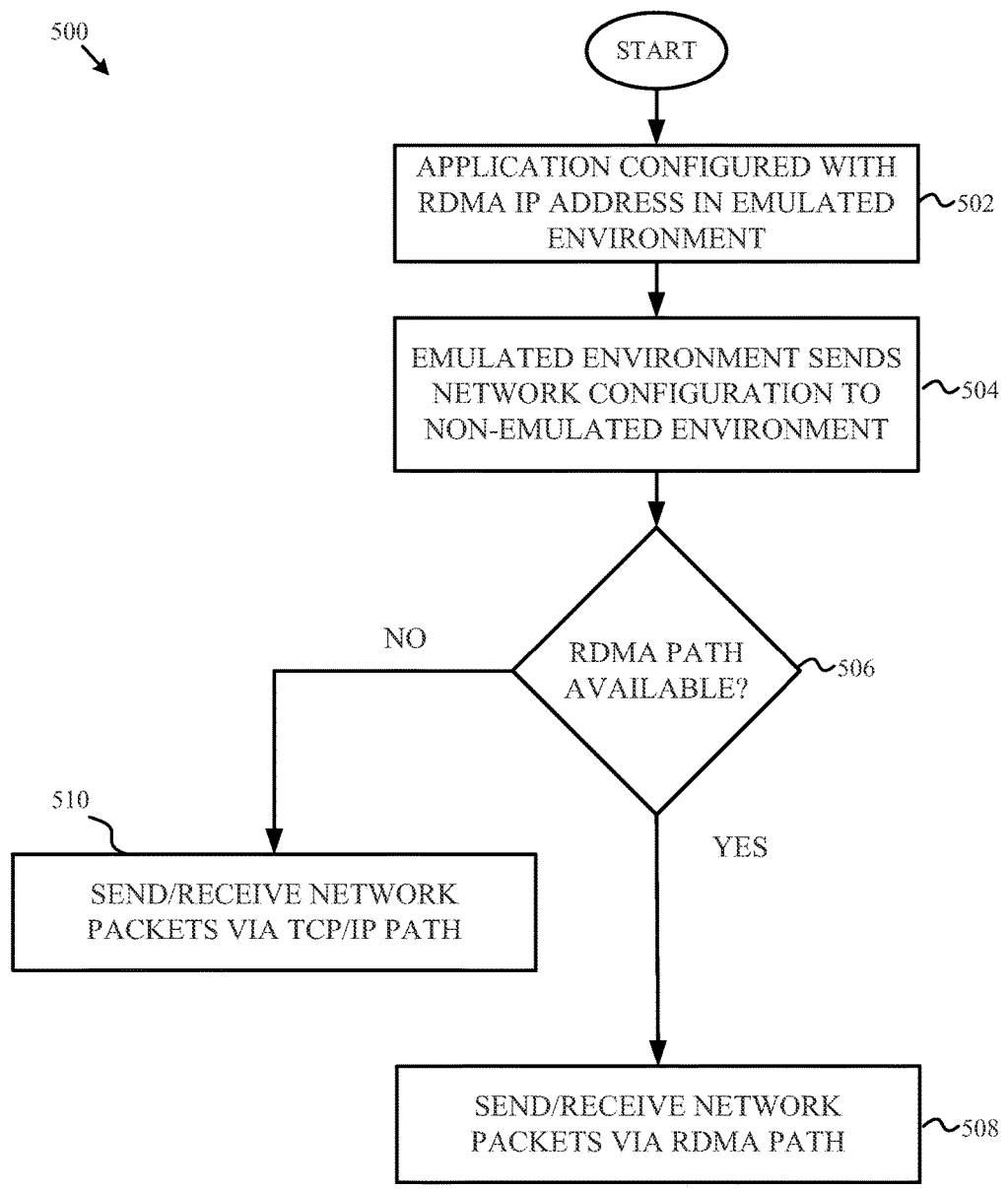
FIG. 5 is a flow chart illustrating a process of selecting a data path for network traffic using IP addresses according to one embodiment of the disclosure.

FIG. 5 is a flow chart illustrating a process of selecting a data path for network traffic using IP addresses according to one embodiment of the disclosure. Method 500 may include, at block 502, an application, such as a OS2200 application, in an emulated environment being configured with an IP address assigned for RDMA transfers. The application may be configured when an administrator configures the address within the emulated environment. In some embodiments, for example, an application may request a TCP active open to a remote address and indicate a local address of 0. At block 504, method 500 may include the emulated environment sending the network configured to the non-emulated environment. Method 500 may further include at block 506 determining if an RDMA path is available. In the embodiment shown, this step is performed by XNIOP. XNIOP may determine that the request is an RDMA request in one or more ways. In some embodiments, for example, XNIOP may determine via Linux routing tables the correct local address to use based on the CPCommOS request. In other embodiments, XNIOP may match the source IP address to an address flagged for RDMA transfers. In yet other embodiments, XNIOP may determine is a recipient of the network transfer is capable of receiving RDMA transfers. If the request is an RDMA request, XNIOP may call the OFED API. If the OFED API sends an answer to XNIOP, method 500 may continue at block 508 by transferring, either sending or receiving, the network packets via an RDMA data path. If XNIOP does not receive an answer from OFED API, XNIOP may determine that an RDMA data path is unavailable. In this case, method 500 may continue at block 510 by transferring, either sending or receiving, the network packets via a BSD sockets path through the network stack.

Figure 6:
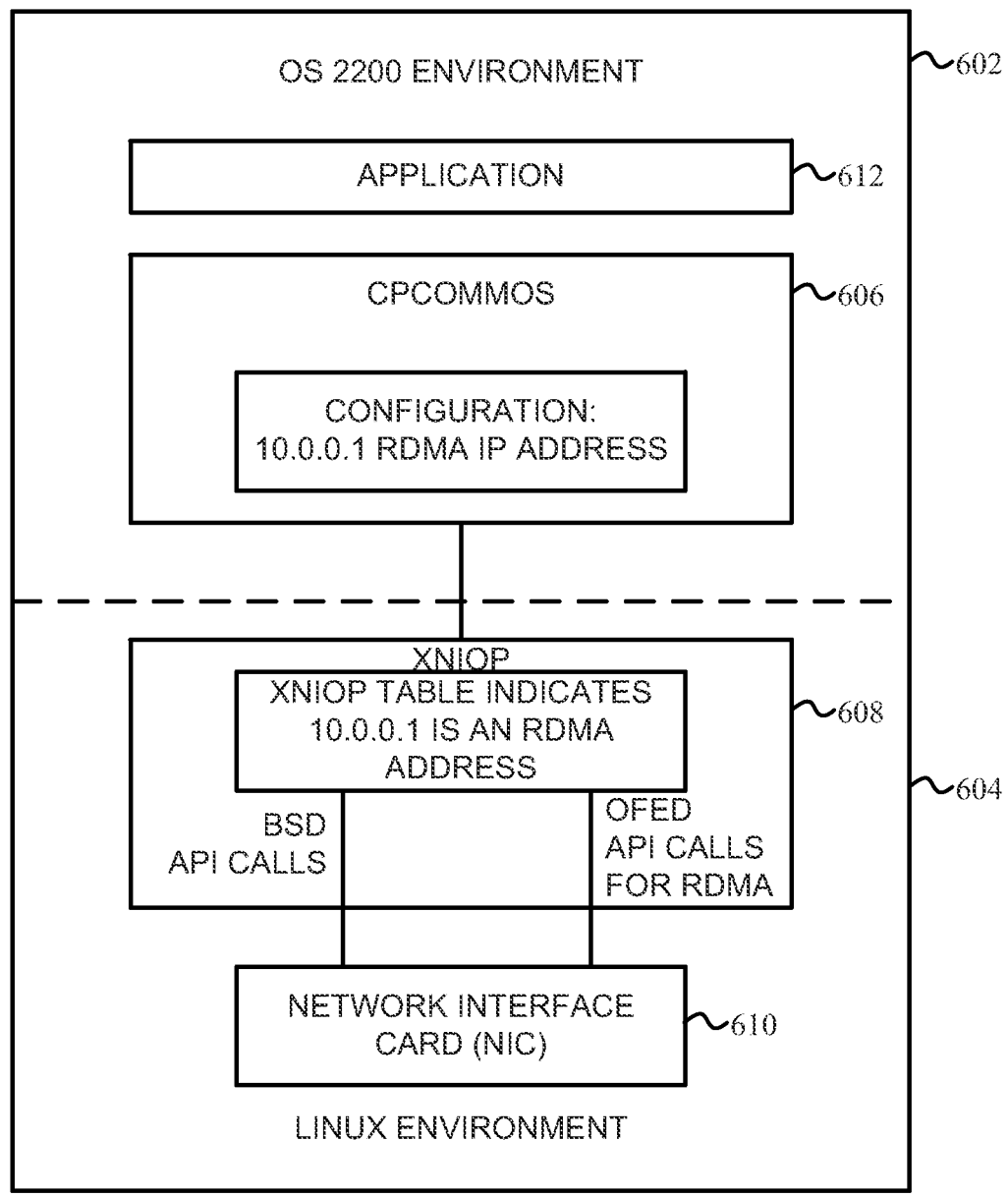
FIG. 6 is a block diagram illustrating configuration of an application in an emulated environment for RDMA transfer based on an IP address according to one embodiment of the disclosure.

FIG. 6 is a block diagram illustrating configuration of an application in an emulated environment for RDMA transfer based on an IP address according to one embodiment of the disclosure. Inside CPCommOS 606, an IP address (e.g., 10.0.0.1) may be configured to be an RDMA address. This configuration may be transmitted to XNIOP 608. When an application 612 executing in the emulated environment 602 calls standard APIs for CPCommOS 606, CPCommOS 606 passes the information to XNIOP 608 in the host operating system environment 604. XNIOP 608 may maintain a table of IP address, and is aware of which IP addresses have been designated for RDMA transfers and which have not. XNIOP 608 would then call the OFED API for RDMA transfers. IP addresses that have not been designated as RDMA would call the BSD sockets APIs. Each of the APIs controls the network interface card (NIC) 610, such as an InfiniBand interface card, to execute the network transfer request through RDMA transfers or non-RDMA transfers.

The schematic flow chart diagram of FIGS. 5 AND 6 is generally set forth as a logical flow chart diagram. As such, the depicted order and labeled steps are indicative of one aspect of the disclosed method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagram, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Those of skill would appreciate that the various illustrative logical blocks, modules, circuits, and algorithm steps described in connection with the disclosure herein may be implemented as electronic hardware, computer software stored on a computing device and executed by one or more processing devices, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

In some embodiments, the techniques or steps of a method described in connection with the aspects disclosed herein may be embodied directly in hardware, in software executed by a processor, or in a combination of the two. In some aspects of the disclosure, any software module, software layer, or thread described herein may comprise an engine comprising firmware or software and hardware configured to perform aspects of the described herein. In general, functions of a software module or software layer described herein may be embodied directly in hardware, or embodied as software executed by a processor, or embodied as a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium may be coupled to the processor such that the processor can read data from, and write data to, the storage medium. In the alternative, the storage medium may be integral to the processor. The processor and the storage medium may reside in an ASIC. The ASIC may reside in a user device. In the alternative, the processor and the storage medium may reside as discrete components in a user device.

If implemented in firmware and/or software, the functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and blu-ray discs. Generally, disks reproduce data magnetically, and discs reproduce data optically. Combinations of the above should also be included within the scope of computer-readable media.

In addition to storage on computer-readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

While the aspects of the disclosure described herein have been described with reference to numerous specific details, one of ordinary skill in the art will recognize that the aspects of the disclosure can be embodied in other specific forms without departing from the spirit of the aspects of the disclosure. Thus, one of ordinary skill in the art would understand that the aspects described herein are not to be limited by the foregoing illustrative details, but rather are to be defined by the appended claims.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present invention, disclosure, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A computer implemented method for determining and configuring a data path used to transport network data transfers within a computing system, the computing system, having an emulated environment having an emulated program, a non-emulated environment, a network interface, memory, and a processor, the method comprising:

assigning a port internet protocol (IP) address to a network port utilizing an internet protocol network connection used by the non-emulated interface;

assigning an RDMA IP address to an RDMA interface;

receiving, at a non-emulated interface, a network transfer request from the emulated program executed in the emulated environment to a particular IP address;

determining using the port IP address, by the non-emulated interface, that the network transfer request should be handled within the non-emulated environment by a remote direct memory access (RDMA) transfer;

attempting to transfer network traffic packets related to the network transfer request within the non-emulated environment using RDMA when the network transfer request is determined using the IP address to be handled by a RDMA transfer;

determining using the IP address, by the non-emulated interface, that the network transfer request should be handled within the non-emulated environment by an internet protocol (IP) network transfer; and attempting to transfer network traffic packets related to the network transfer request within the non-emulated environment using the IP network transfer when the network transfer request is determined to be handled by the IP network transfer;

wherein the IP addresses assigned to network connections and the RDMA IP addresses are maintained within the non-emulated environment using a connection table.

2. The method of claim 1, wherein the step of receiving the network transfer request comprises receiving a network transfer request with a source address corresponding to an RDMA IP address from a customer application, and wherein the step of determining comprises detecting that an IP address is flagged as an RDMA IP address.

3. The method of claim 1, wherein the step of determining comprises detecting that a recipient of the network transfer request can respond to the RDMA transfer.

4. The method of claim 3, wherein the step of attempting to transfer the network traffic packets comprises:

calling, by the non-emulated interface, an application programming interface (API) suitable for an RDMA transfer; and waiting to receive an answer from the API;

determining that no answer is received from the API suitable for an RDMA transfer; and sending network traffic packets related to the network transfer request through a non-RDMA API.

5. The method of claim 1, wherein the application uses the same function calls for both RDMA network transfer requests and non-RDMA network transfer requests.

6. The method of claim 5, wherein the emulated environment uses the same function calls for both RDMA network transfer requests and non-RDMA network transfer requests.

7. A computer program product, comprising:

a non-transitory computer-readable medium comprising code to perform the steps of:

assigning a port internet protocol (IP) address to a network port utilizing an internet protocol network connection used by the non-emulated interface;

assigning an RDMA IP address to an RDMA interface;

receiving, at a non-emulated interface, a network transfer request from the emulated program executed in the emulated environment to a particular IP address;

determining using the port IP address, by the non-emulated interface, that the network transfer request should be handled within the non-emulated environment by a remote direct memory access (RDMA) transfer;

attempting to transfer network traffic packets related to the network transfer request within the non-emulated environment using RDMA when the network transfer request is determined using the IP address to be handled by a RDMA transfer;

determining using the IP address, by the non-emulated interface, that the network transfer request should be handled within the non-emulated environment by an internet protocol (IP) network transfer; and attempting to transfer network traffic packets related to the network transfer request within the non-emulated environment using the IP network transfer when the network transfer request is determined to be handled by the IP network transfer;

wherein the IP addresses assigned to network connections and the RDMA IP addresses are maintained within the non-emulated environment using a connection table.

8. The computer program product of claim 7, wherein the step of receiving the network transfer request comprises receiving a network transfer request with a source address corresponding to an RDMA IP address from a customer application, and wherein the step of determining comprises detecting that an IP address is flagged as an IP address.

9. The computer program product of claim 7, wherein the step of determining comprises detecting that a recipient of the network transfer request can respond to the RDMA transfer.

10. The computer program product of claim 9, wherein the step of attempting to send the network traffic packets comprises:

calling, by the non-emulated interface, an application programming interface (API) suitable for an RDMA transfer; and waiting to receive an answer from the API;

determining that no answer is received from the API suitable for an RDMA transfer; and transferring network traffic packets related to the network transfer request through a non-RDMA API.

11. The computer program product of claim 7, wherein the application uses the same function calls for both RDMA network transfer requests and non-RDMA network transfer requests.

12. The computer program product of claim 11, wherein the emulated environment uses the same function calls for both RDMA network transfer requests and non-RDMA network transfer requests.

13. An apparatus, comprising:

a network interface card (NIC);

a memory; and a processor coupled to the memory and to the network interface card (NIC), the processor configured to execute the steps of:

assigning port internet protocol (IP) address to a network port utilizing an internet protocol network connection used by the non-emulated interface;

assigning an RDMA IP address to an RDMA interface;

receiving, at a non-emulated interface, a network transfer request from the emulated program executed in the emulated environment to a particular IP address;

determining using the port IP address, by the non-emulated interface, that the network transfer request should be handled within the non-emulated environment by a remote direct memory access (RDMA) transfer;

attempting to transfer network traffic packets related to the network transfer request within the non-emulated environment using RDMA when the network transfer request is determined using the IP address to be handled by a RDMA transfer;

determining using the IP address, by the non-emulated interface, that the network transfer request should be handled within the non-emulated environment by an internet protocol (IP) network transfer; and attempting to transfer network traffic packets related to the network transfer request within the non-emulated environment using the IP network transfer when the network transfer request is determined to be handled by the IP network transfer;

wherein the IP addresses assigned to network connections and the RDMA IP addresses are maintained within the non-emulated environment using a connection table.

14. The apparatus of claim 13, wherein the step of receiving the network transfer request comprises receiving a network transfer request with a source address corresponding to an RDMA IP address from a customer application, and wherein the step of determining comprises detecting that an IP address is flagged as an RDMA IP address.

15. The apparatus of claim 13, wherein the step of determining comprises detecting that a recipient of the network transfer request can respond to the RDMA transfer.

16. The apparatus of claim 15, wherein the step of attempting to send the network traffic packets comprises:

calling, by the non-emulated interface, an application programming interface (API) suitable for an RDMA transfer; and waiting to receive an answer from the API;

determining that no answer is received from the API suitable for an RDMA transfer; and transferring network traffic packets related to the network transfer request through a non-RDMA API.

17. The apparatus of claim 13, wherein the application uses the same function calls for both RDMA network transfer requests and non-RDMA network transfer requests.

18. The apparatus of claim 17, wherein the emulated environment uses the same function calls for both RDMA network transfer requests and non-RDMA network transfer requests.

* * * * *